United States Patent [19]
Diem

[11] Patent Number: 5,696,500
[45] Date of Patent: Dec. 9, 1997

[54] MULTI-MEDIA RECEIVER AND SYSTEM THEREFOR

[75] Inventor: Darrell Dennis Diem, Boynton Beach, Fla.

[73] Assignee: Motorola, Inc., Schaumburg, Ill.

[21] Appl. No.: 516,596

[22] Filed: Aug. 18, 1995

[51] Int. Cl.$^6$ .................................................. H04Q 7/14
[52] U.S. Cl. .................... 340/825.44; 455/38.4; 379/56
[58] Field of Search ............... 340/825.44–825.49, 340/825.22, 825.26, 825.27, 311.1; 455/38.1–38.5; 379/56, 57; 395/154, 200.03, 200.04

[56] References Cited

U.S. PATENT DOCUMENTS

| | | | |
|---|---|---|---|
| 4,468,813 | 8/1984 | Burke et al. | 455/38.2 |
| 5,128,665 | 7/1992 | DeLuca et al. | 340/825.47 |
| 5,140,419 | 8/1992 | Galumbeck et al. | 340/825.44 X |
| 5,168,493 | 12/1992 | Nelson et al. | 340/825.44 X |
| 5,241,305 | 8/1993 | Fascenda et al. | 340/825.44 |
| 5,315,635 | 5/1994 | Kane | 379/57 |

*Primary Examiner*—Edwin C. Holloway, III
*Attorney, Agent, or Firm*—Philip P. Macnak

[57] ABSTRACT

A system for transmitting messages and multi-media presentations to a multi-media receiver (114). The system includes a multi-media messaging terminal (106) which has a controller (216) for the preparation and transmission of a multi-media presentation, composed of multi-media files. The multi-media files include user programmed text events (1258), graphics events (1260), audio events (1254) and multi-media commands (1256). The controller (216) is coupled to a memory, for storing the user programmed text events, graphics events, audio events and multi-media commands, and a multi-media interface (208). The multi-media interface (208) provides a interface to transfer the multi-media files being transferred from the multi-media terminal to a paging system. The paging system encodes multi-media files received with encoder (228) for transmission with transmitter (108).

22 Claims, 12 Drawing Sheets

MULTI-MEDIA RECEIVER AND SYSTEM THEREFOR

FIELD OF THE INVENTION

This invention relates generally to multi-media systems, and more specifically to multi-media systems utilizing a paging channel for communications.

BACKGROUND OF THE INVENTION

Multi-media systems combine graphics, sound and text information, to present an interesting and informative presentation to the user. Such presentations find applications ranging from educational and informative presentations to user. The use of sound and graphics is an important tool in capturing and holding the interest of the audience.

Multi-media systems generally utilize a work station, personal computer, or a portable computer, with sound and graphics capability. Because of the large files used by these systems, files are either maintained locally on a high capacity storage device such as an hard disk drive or on a file server using communicating with the multi-media terminal via a capacity communication channel.

Paging channels offer an excellent means for communicating with groups as well as individuals. The uses of multi-media presentation are advantageous because of their ability to hold the interest of the audience. It would also be highly desirable to extend multi-media presentations to small portable products. However without special processing, large multi-media files could totally block a radio paging channel.

Thus what is needed is a method and apparatus for reducing the amount of data transmitted while maintaining an interesting and informative presentation to the user. What is further needed is a multi-media system that reduces the quantity of data to be transmitted and formats the data to be transmitted into a form suitable for transmission over the selected medium.

SUMMARY OF THE INVENTION

Accordingly, in a first aspect of the present invention there is provided a multi-media receiver that includes a receiver for receiving messages, text events, graphics events, audio events and multi-media commands transmitted over a radio frequency channel. The multi-media commands control a multi-media event presentation that includes concurrent presentation of text events, graphics events and audio events. The multi-media receiver includes a memory, that stores the messages received, the preprogrammed text events, graphics events, audio events and the multi-media commands which are directed to the multi-media receiver. The multi-media receiver is coupled to a controller, that responds to the multi-media commands stored in the memory, for scheduling the retrieval of the preprogrammed text events, graphics events and audio events stored in the memory. The multi-media receiver also includes a presentation device, that responds to the preprogrammed text events, graphics events and audio events retrieved, for providing a multi-media event presentation.

Accordingly, in a second aspect of the present invention there is provided a system for transmitting messages and multi-media presentations to a multi-media receiver. The system includes a multi-media messaging terminal. The multi-media messaging terminal has a controller for the preparation and transmission of a multi-media presentation, and multi-media files. The multi-media files include user programmed text events, graphics events, audio events and multi-media commands. The controller of the multi-media messaging terminal is coupled to a memory, for storing the user programmed text events, graphics events, audio events and multi-media commands, and a multi-media interface. The multi-media interface provides a interface to transfer the multi-media files being transferred from the multi-media messaging terminal to a paging system. The paging system has an encoder, coupled to the multi-media interface, for encoding the messages and the multi-media files received for transmission. A transmitter, is coupled to the encoder, for transmitting the message and multi-media files which are encoded.

DESCRIPTION OF A PREFERRED EMBODIMENT

Figure 1:
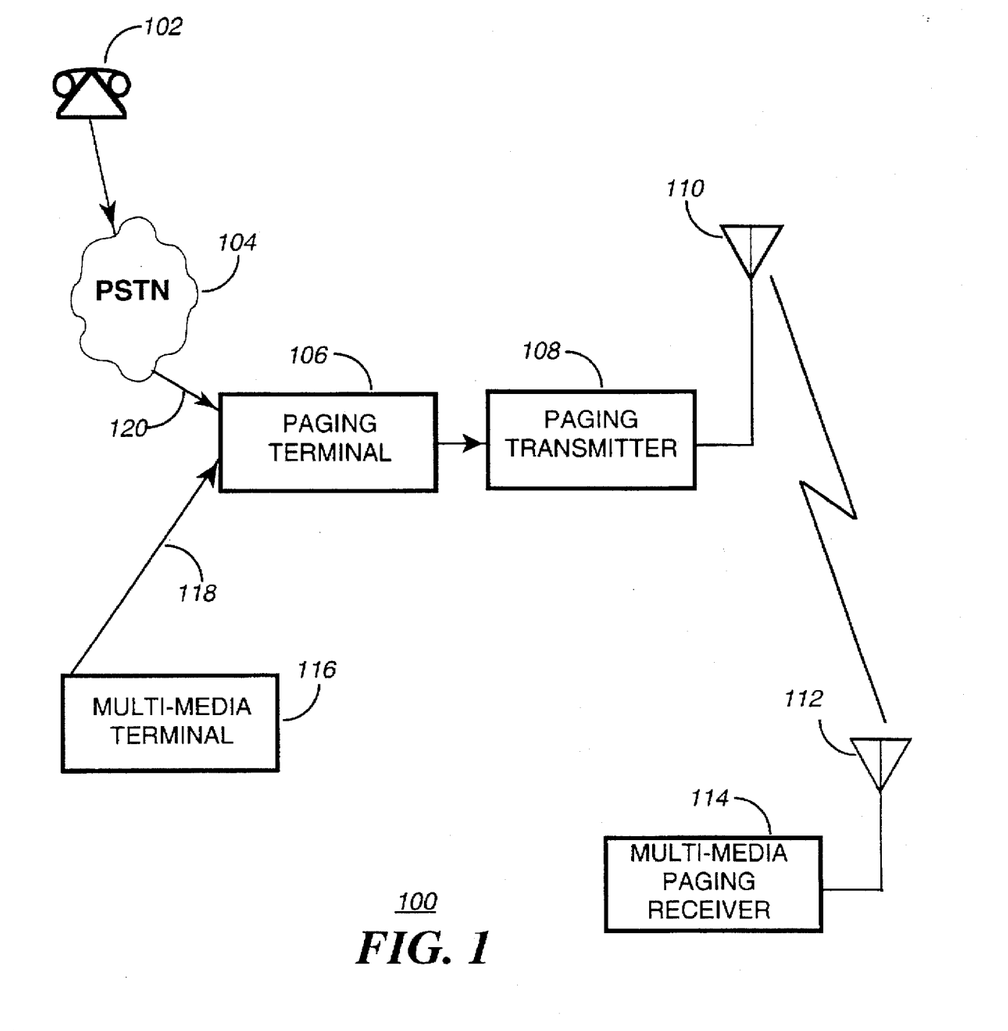
FIG. 1 is a block diagram of a communication system providing multi-media transmission and presentations in accordance with the present invention.

FIG. 1 shows a block diagram of a communications system 100, such as a paging system, providing multi-media program transmission in accordance with the present invention.

By way of example, a paging system will be utilized to describe the present invention, although it will be appreciated that other communication systems transmitting multi-media programs will benefit from the present invention as well. A paging system is designed to provide service to a variety of users each requiring different services, such as alpha paging services, numeric paging services and voice paging services. Paging systems can also provide specialized services such as information services, and multi-media program transmission described herein. Examples of multi-media programs are information service message, advertisements and instructional announcements directed at a individual or a group of users. A multi-media user composes a program consisting of a sequence of new events, previously generated events and or library events using the multi-media terminal 116. The multi-media terminal 116 processes the program and produces a series of audio event files, graphics event files and text event files, and a multi-media command file. The multi-media terminal 116 transmits these files via a communication link 118 to the multi-media messaging terminal 106. A caller may also originate a conventional page by communicating with a multi-media messaging terminal 106 via a telephone 102 through a public switched telephone network (PSTN) 104 and a PSTN connection 120. The multi-media messaging terminal 106 encodes the files received from the multi-media terminal 116 or the message received from the paging user as paging messages and places the encoded message in a transmission queue. Paging messages are also herein referred to as selective call messages. At an appropriate time, the message is transmitted by the paging transmitter 108 via transmitting antenna 110. It will be appreciated that in a simulcast transmission system, a multiplicity of transmitters covering different geographic areas can be utilized as well.

The multi-media service subscriber has a multi-media receiver 114 for receiving messages and text events, graphics events, audio events and multi-media commands transmitted over a radio channel and for presenting a multi media event presentation. The signal transmitted from the transmitting antenna 110 is intercepted by a receiving antenna 112 and processed by a multi-media receiver 114. The multi-media receiver 114 user being paged is alerted and the message is displayed or annunciated depending on the type of messaging being received.

Figure 2:
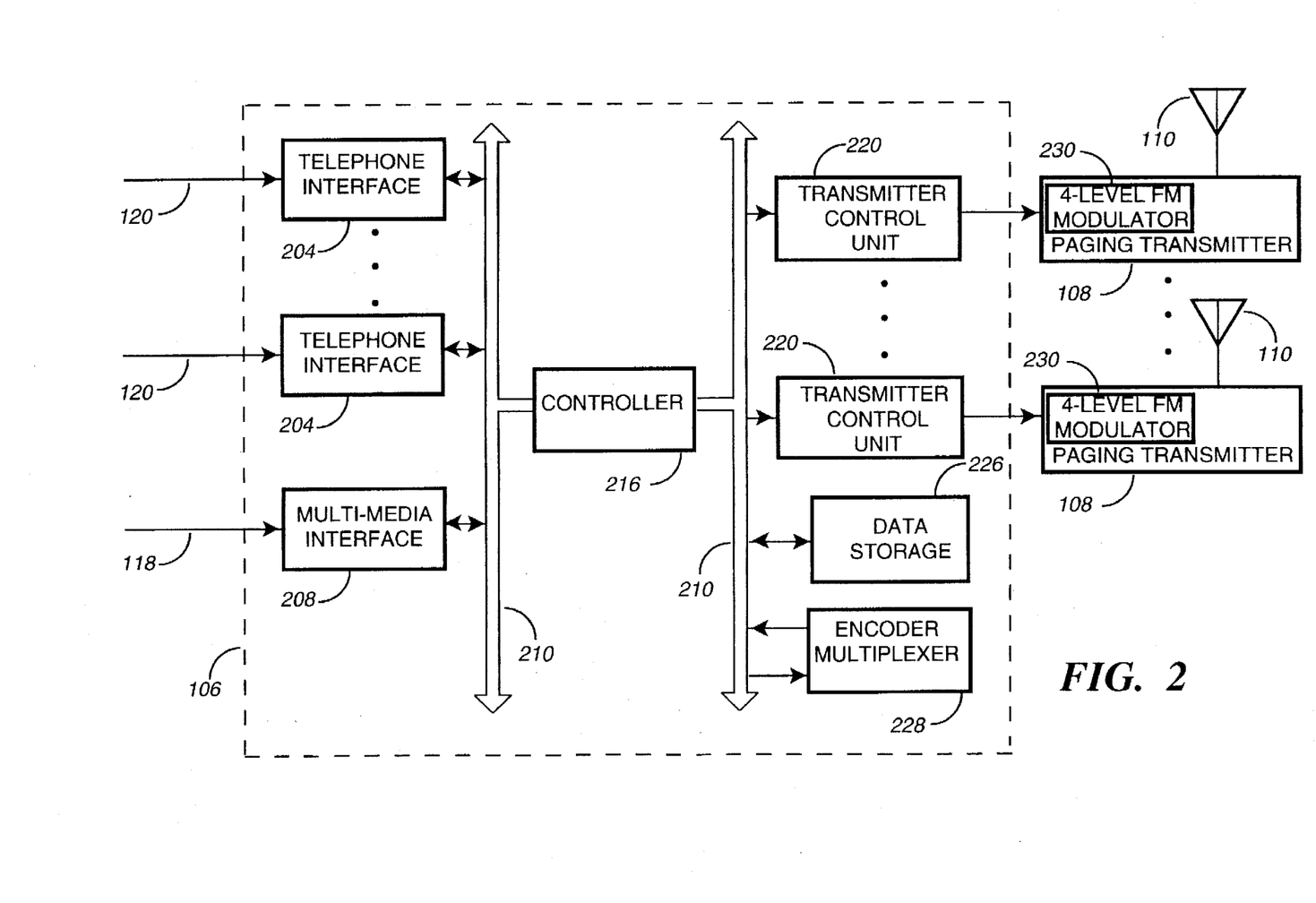
FIG. 2 is a electrical block diagram of a paging terminal and associated paging transmitters of FIG. 1, providing multi-media transmission in accordance with the present invention.

An electrical block diagram of the multi-media messaging terminal 106 and the paging transmitter 108 utilizing the digital voice compression process in accordance with the present invention is shown in FIG. 2. The multi-media messaging terminal 106 shown is of a type that would be used to serve a large number of simultaneous users, such as in a commercial Radio Common Carrier (RCC) system. The multi-media messaging terminal 106 utilizes a number of input devices, signal processing devices and output devices controlled by a controller 216. Communications between the controller 216 and the various devices that compose the multi-media messaging terminal 106 are handled by a digital control buss 210. It will be appreciated that the digital control buss 210 can be extended to provide for expansion of the multi-media messaging terminal 106.

The interface between the PSTN 104 and the multi-media messaging terminal 106 is provided by a plurality of PSTN connections 120. It will be appreciated that the plurality of PSTN connections 120 can be either a plurality of multi-call per line multiplexed digital PSTN connections or plurality of single call per line analog PSTN connections.

Each PSTN connection 120 is serviced by a telephone interface 204. The telephone interface 204 provides the necessary signal conditioning, signaling, supervision, synchronization, de-multiplexing, analog to digital and digital to analog conversion, dual tone multi frequency (DTMF) decoding and generation, modem tone generation and decoding and regulatory protection requirements for operation of the paging terminal in accordance with the present invention. As will be described below, request for service and supervisory responses are controlled by the controller 216. Communications between the telephone interface 204 and the controller 216 passes over the digital control buss 210.

A multi-media interface 208 provides a communications interface between the multi-media messaging terminal 106 and the multi-media terminal 116 via the communication link 118, for the purpose of transferring multi-media files. In the case where the multi-media terminal 116 is located remote from the multi-media messaging terminal 106 the multi-media interface 208, for example, is a conventional modem and the communication link 118 is typically a leased phone line. In the case where the multi-media terminal 116 is collocated with the multi-media messaging terminal 106 the multi-media interface 208, for example, is a RS232 interface.

The processing of a page request, for example, in the case of a numeric messaging, proceeds in the following manner. When an incoming call is detected, a request for service is sent from the telephone interface 204 to the controller 216. The controller 216 is programmed to perform all of the signal processing functions required to complete the paging process. The controller 216 prompts the originator for a DTMF message. The telephone interface 204 receives the DTMF digits generated by the originator's telephone and generates a digital message corresponding to the DTMF digits received. The digital message generated by the telephone interface 204 is coupled to a paging encoder 228, via the digital control buss 210, under the control of the controller 216. The paging encoder 228 encodes the data into a suitable paging protocol. Preferably the paging protocols utilize a well-known digital selective call signaling protocol, such as the Motorola FLEX™ family of protocols. It will be appreciated that other high speed signaling protocols, such as the POCSAG 2400 paging protocol can be utilized as well. The controller 216 directs the encoded data generated by the paging encoder 228 to be stored in a data storage device 226 (such as RAM or magnetic media such as hard disk drive) via the digital control buss 210. At an appropriate time, the information in the form of encoded data is downloaded into the transmitter control unit 220, under control of the controller 216, via the digital control buss 210 and the information is transmitted using the paging transmitter 108 and the transmitting antenna 110.

The paging transmitter 108 includes a four level frequency modulation (FM) modulator 230 for modulating the encoded. The FLEX™ protocol provides data transmission at 1600 bits per second (bps), 3200 bps and 6400 bps. The FLEX™ protocol operating at 6400 bps transmits 3200 symbols per second with each symbol representing two bits. The following table illustrates the relationship between the bits and the FM shift levels.

| BIT 0 | BIT 1 | FREQUENCY |
| --- | --- | --- |
| 1 | 0 | Carrier + 4800 Hz |
| 1 | 1 | Carrier + 1600 Hz |
| 0 | 1 | Carrier − 1600 Hz |
| 0 | 0 | Carrier − 4800 Hz |

Figure 3:
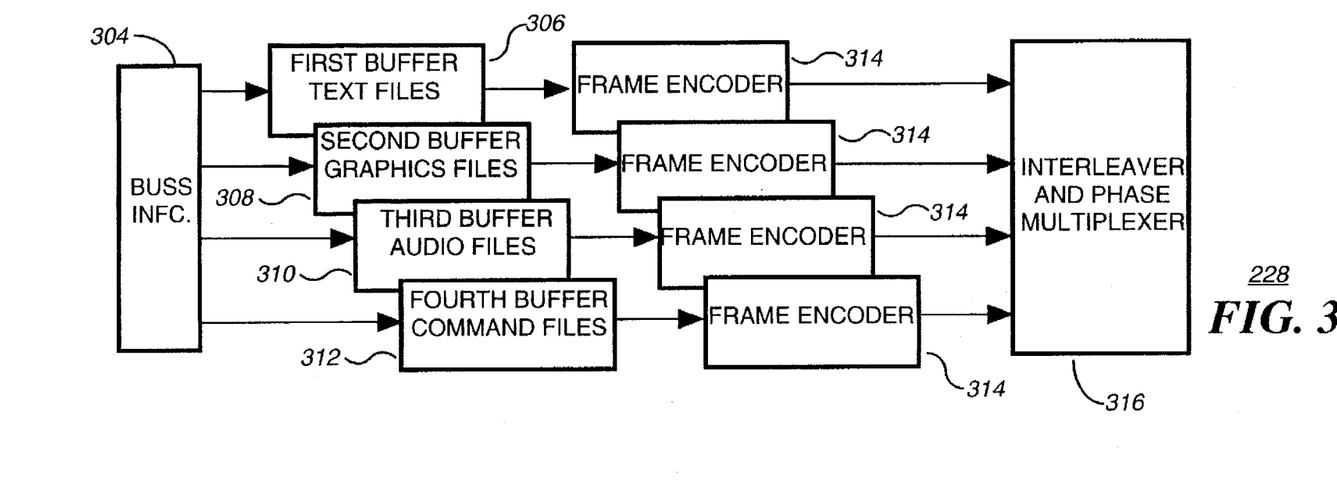
FIG. 3 is a electrical block diagram of the encoder multiplexer shown in FIG. 2.

FIG. 3 is a electrical block diagram of the paging encoder 228 used to implement the four channels provided by the FLEX™ protocol. The four channels provided by the FLEX™ protocol are herein referred to as subchannels and are interleaved for transmission on a single carrier frequency. The buss interface 304 is coupled to the controller 216 through the digital control buss 210. The buss interface 304 under control of the controller 216, directs data files to an appropriate buffer. In the present invention, audio event files are temporarily stored in a first buffer 306, graphics event files are stored in a second buffer 308, text event files are stored in the third buffer 310 and multi-media command files are stored in a fourth buffer 312. The outputs of the first buffer 306, the second buffer 308, the third buffer 310 and the fourth buffer 312 are coupled to four frame encoders 314 which encode the data using a (32,21) BCH code word format.

The encoded code words from the four frame encoders 314 are interleaved on a bit by bit basis in an interleaver and phase multiplexer 316. The interleaver and phase multiplexer 316 rotates through four phases, and during the first rotation, phase one, the interleaver and phase multiplexer 316 selects the first bit of the encoded address and text code words. In phase two the interleaver and phase multiplexer 316 selects the first bit of the encoded graphics code words. In phase three the interleaver and phase multiplexer 316 selects the first bit of the encoded audio code words. In phase four the interleaver and phase multiplexer 316 selects the first bit of the encoded command code words, completing one rotation. Phase one of the second rotation follows phase four phase of the first rotation. The interleaver and phase multiplexer 316 continues to rotate through the four phases advancing one bit per rotation until all of the code words are interleaved. The output the interleaver and phase multiplexer 316 is coupled to the digital control buss 210. Interleaving allows the simultaneous transmission of the text event files, the graphics event files, the audio event files and the multi-media command files which provide multi-media commands, thus significantly reducing the time required for transmission of all of the files.

Figure 4:
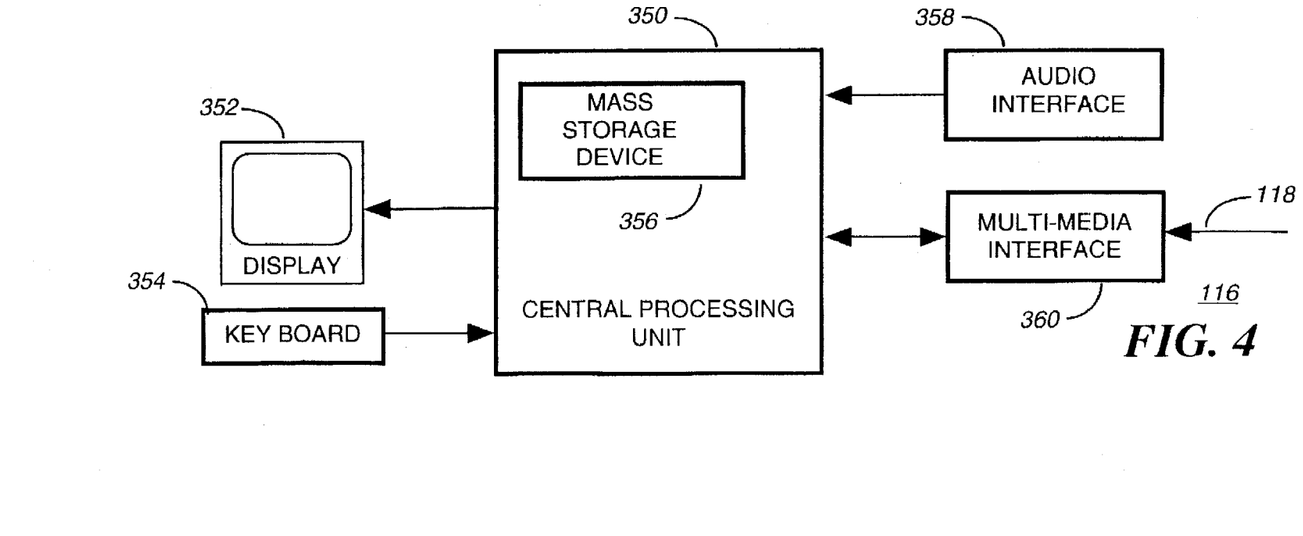
FIG. 4 is a electrical block diagram of the multi-media terminal shown in FIG. 1.

FIG. 4 is a electrical block diagram of the multi-media terminal 116. The multi-media terminal 116 is preferably a personal computer. A computer workstation can also be used. The multi-media terminal 116 includes an audio interface 358, a key board 354 and a display 352 coupled to the central processing unit 350 for the purpose of composing and entering multi-media presentations. The central processing unit 350 includes a mass storage device 356 such as a hard disk drive for the storage of the multi-media files and the storage of records of memory usage in the multi-media receiver 114. A multi-media interface 360 provides a communications interface between the multi-media terminal 116 and the multi-media messaging terminal 106 via the communication link 118, for the purpose of transferring multi-media files.

Figure 5:
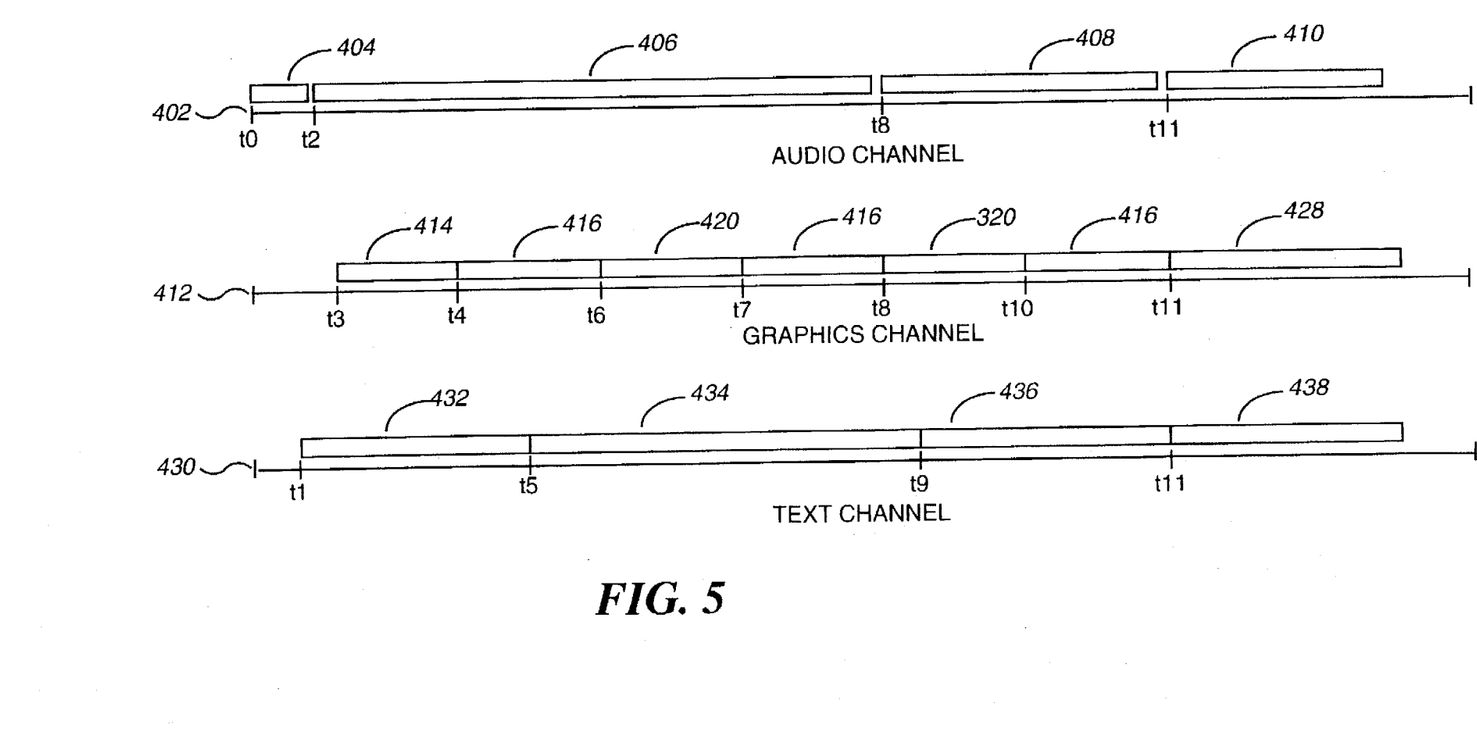
FIG. 5 is a diagram illustrating an example of a multi-media presentation that has a audio, graphics and text presentations taking place concurrently that is transmitted with the system shown in FIG. 1.

FIG. 5 shows an example of a diagram depicting a multi-media presentation in accordance with the present invention. The originator of the multi-media presentation plans the sequence of events which produces a presentation that best conveys the information the originator is intending to pass to the receiver. Such a presentation, for example, can consist of the series of events such as described below. For the purpose of explanation, three time lines are shown, an audio channel time line 402, a graphics channel time line 412, and a text channel time line 430. The audio channel time line 402, the graphics channel time line 412, and the text channel time line 430 play concurrently and demonstrates how a series of related events can be mixed to produce an attention holding presentation. The program starts at time mark t0 where a first introductory audio event 404 is started followed by a first text event 432 started at time mark t1. Next a second audio event 406 is started at time mark t2. At time mark t3 a first graphics event 414 is started. At this point, audio events, graphics events, and text events are playing. Starting at time mark t4 graphics event 416 is started followed by an alternating sequence of graphics event 420 and graphics event 416. The two graphics events alternate at time's t6, t7, t8 and t10 producing an eye catching display. At t5 the text changes to a second text event 434. At t8 a third audio event is started simultaneous with one of the changes in the series of alternating graphics events. At time mark t11 concluding audio event 410, graphics event 428 and text event 438 are started, completing the program.

It can be appreciated that the graphics events can consist of a static display or a series of sub-events that repeat producing a degree of animation. Similarly the audio events can consist of one long non-repetitive event or a puerility shorter event that repeats until the run time of the event has completed. For example a short melody that repeats.

Figure 6:
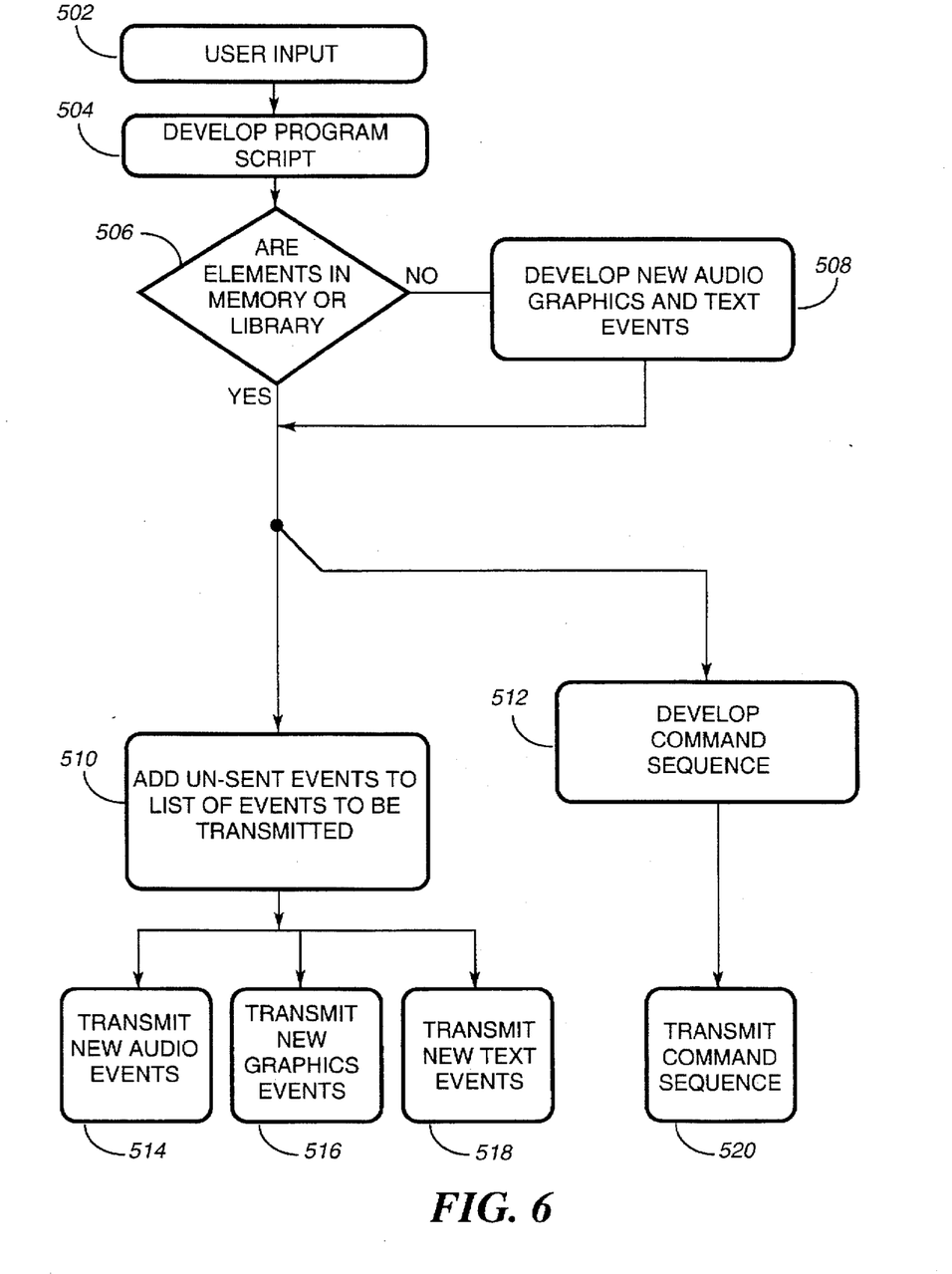
FIG. 6 is a flow chart showing the steps taken to produce the multi-media presentation of FIG. 5.

FIG. 6 is a flow chart depicting the steps taken to produce a multi-media presentation. These steps are performed using the multi-media terminal 116 coupled to the paging terminal via a communication link 118. The process starts in step 502 when the originator inputs the series of events that compose a presentation. The multi-media terminal 116 develops a program script comprising the list of events and time markers in step 504. In step 506 the multi-media terminal 116 searches a library of preprogrammed event files stored in the multi-media terminal 116 and a list of event files that were developed for previous programs that are still stored in the multi-media receiver 114. When no event files are found matching the events in the current program, new event files are developed in step 508. In step 510 a list is developed of event files that must be transmitted to the multi-media receiver 114. A more detailed explanation of the event file will be given below in reference to FIG. 7. The multi-media terminal 116 maintains a list of event files that are stored in the memory of the multi-media receiver 114, and event files that are still in the memory of the multi-media receiver 114 are not resent. This reuse of event files reduces the quantity of data that must be transmitted to the multi-media receiver 114. In step 512 the multi-media command sequence is developed. The multi-media command sequence is a file listing time markers and event files that are to be started at these time markers. A more detailed explanation of the command sequence will be given below in reference to FIG. 8. The new audio event files are transmitted in step 514. The new graphics event files are transmitted in step 516. The new text event files are transmitted in step 518, and the multi-media command sequence is transmitted in step 520. Step 514, step 516, step 518 and step 520 are shown in FIG. 6 on an equal level to indicate that they can be transmitted simultaneously utilizing the four channels provided by the FLEX™ protocol. However it will be appreciated that their order of transmission can be arbitrary.

Figure 7:
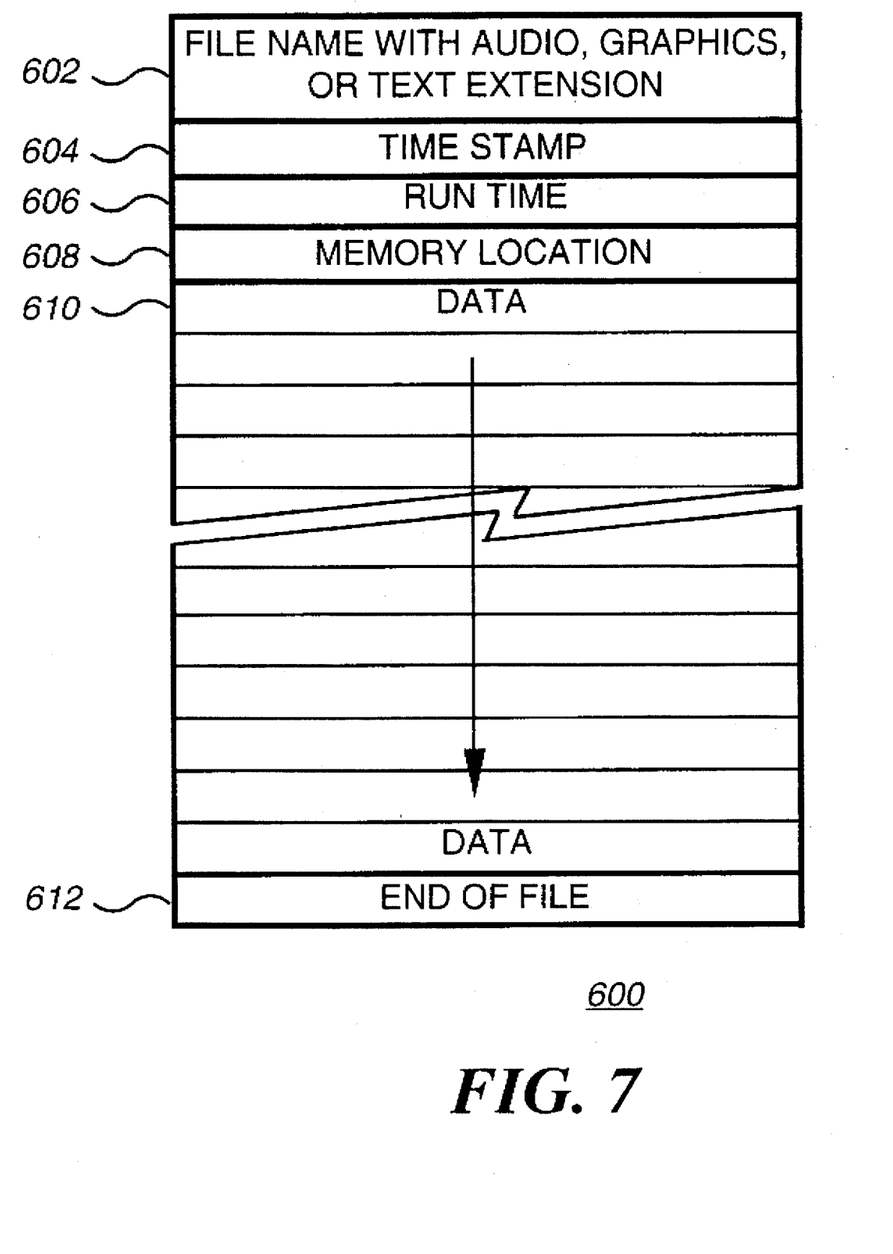
FIG. 7 is chart depicting an event file of the type used in the multi-media presentation illustrated in FIG. 3.

FIG. 7 shows an example of an event file 600 in accordance with the preferred embodiment of the present invention. The format shown in FIG. 7 is used for the audio event files, graphics event files and text event files. The file starts with a file identifier 602. The file identifier 602 comprises a name and an extension identifying the type of file. For example, Name.AUD for an audio event file, Name.BMP for a graphics event file and Name.TXT for a text event file. The time stamp 604 indicates the time the file was transmitted and is used to help purge the multi-media receiver 114 memory of old event files when memory must be cleared for new event files. The run time 606 indicates the total run time of the event and is used to plan the program. The memory location 608 is used to specify the location in the memory of the multi-media receiver 114 where the event file is to be stored after the file has been transmitted by the multi-media messaging terminal 106 and received by the multi-media receiver 114. The data 610 is the audio event file, graphics event files, or text event file data utilized for the multi-media presentation. The file preferably ends with an end of file marker 612.

Figure 8:
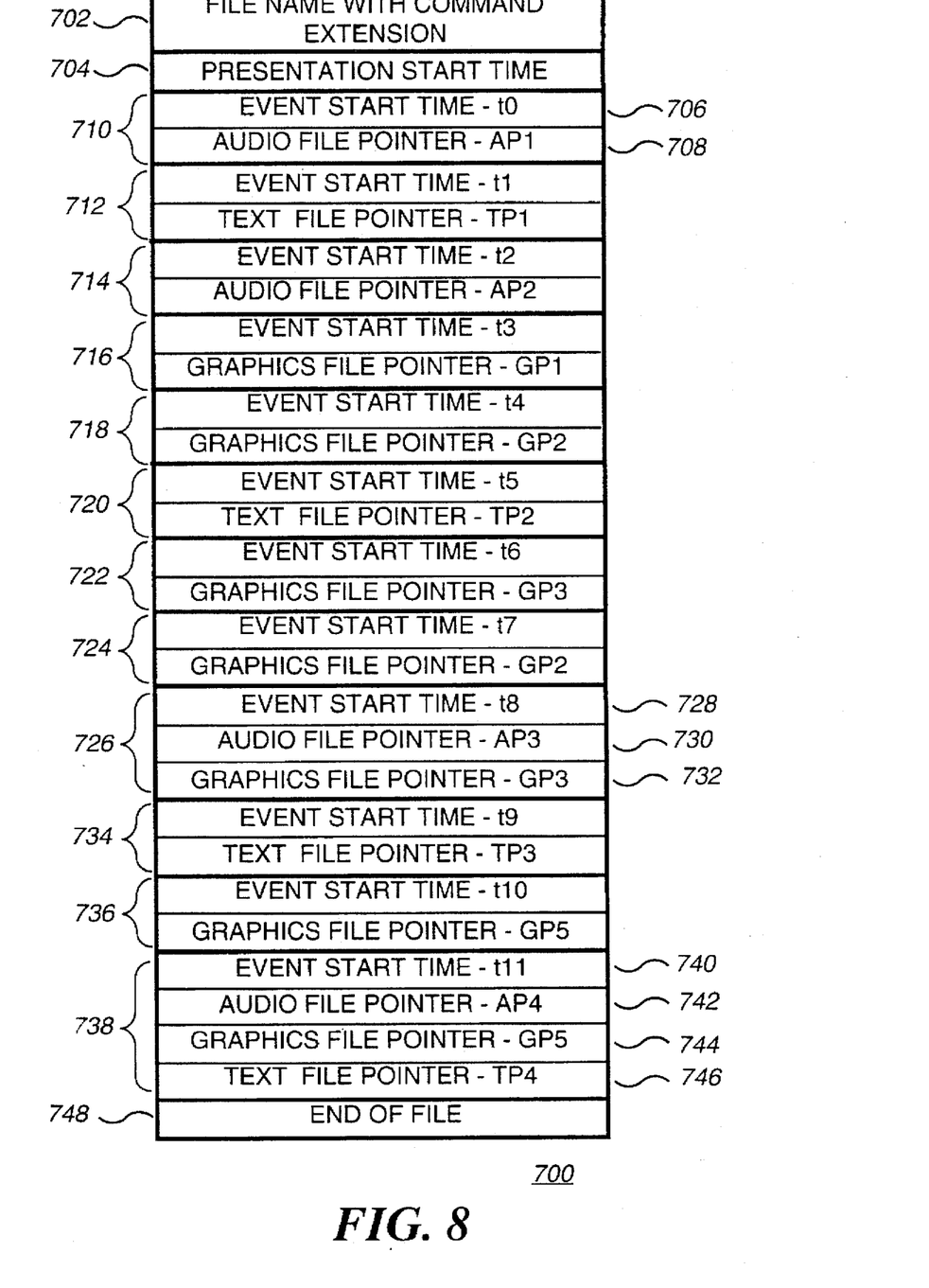
FIG. 8 is chart depicting a command sequence file that directs the multi-media presentation illustrated in FIG. 3.

FIG. 8 shows an example of a multi-media command sequence file 700 generated in accordance with the preferred embodiment of the present invention. The file starts with a file identifier 702. The file identifier 702 comprises a name and an extension identifying the file as a multi-media command sequence file 700, for example, Name.CMD. A presentation start time field 704 is provided to specify a program start time when the program is intended to start at a specific time. In the case where no specific start time is specified this field should be left blank. Following the presentation start time field 704 there is a series of event groups. Event group 710, for example comprise a time mark t0 706 and an audio file pointer AP1 708. The time mark t0 706 specifies the time from the beginning of the program that the events in this event group is to start. In this case, because this is the first event group in the program, the time mark t0 706 will be zero. The audio file pointer AP1 708 is a vector to a memory location in the multi-media receiver 114 where the first audio event file 404 is stored. Similarly event groups 712,714,716,718,720,722,724,734 and 736 each specifies a time mark and a vector to a memory location in the multi-media receiver 114 where the associated event file is stored.

Event group 726 is an example of an event group where two events are started at the same time mark. Here at time mark t8 728, audio event file pointer AP3 730 points at a memory location in the multi-media receiver 114 where the audio event file 408 is stored and graphics event file pointer GP3 732 points at a memory location where the graphics event file 420 is stored. Event group 738 is an example of an event group where three events are started at the same time mark. Here at time mark t11 740, audio event file pointer AP4 742 points at a memory location where the audio event file 410 is stored, graphics event file pointer GP5 744 points at a memory location where the graphics event file 428 is stored and text event file pointer TP4 746 points at a memory location where text event file 438 is stored.

Figure 9:
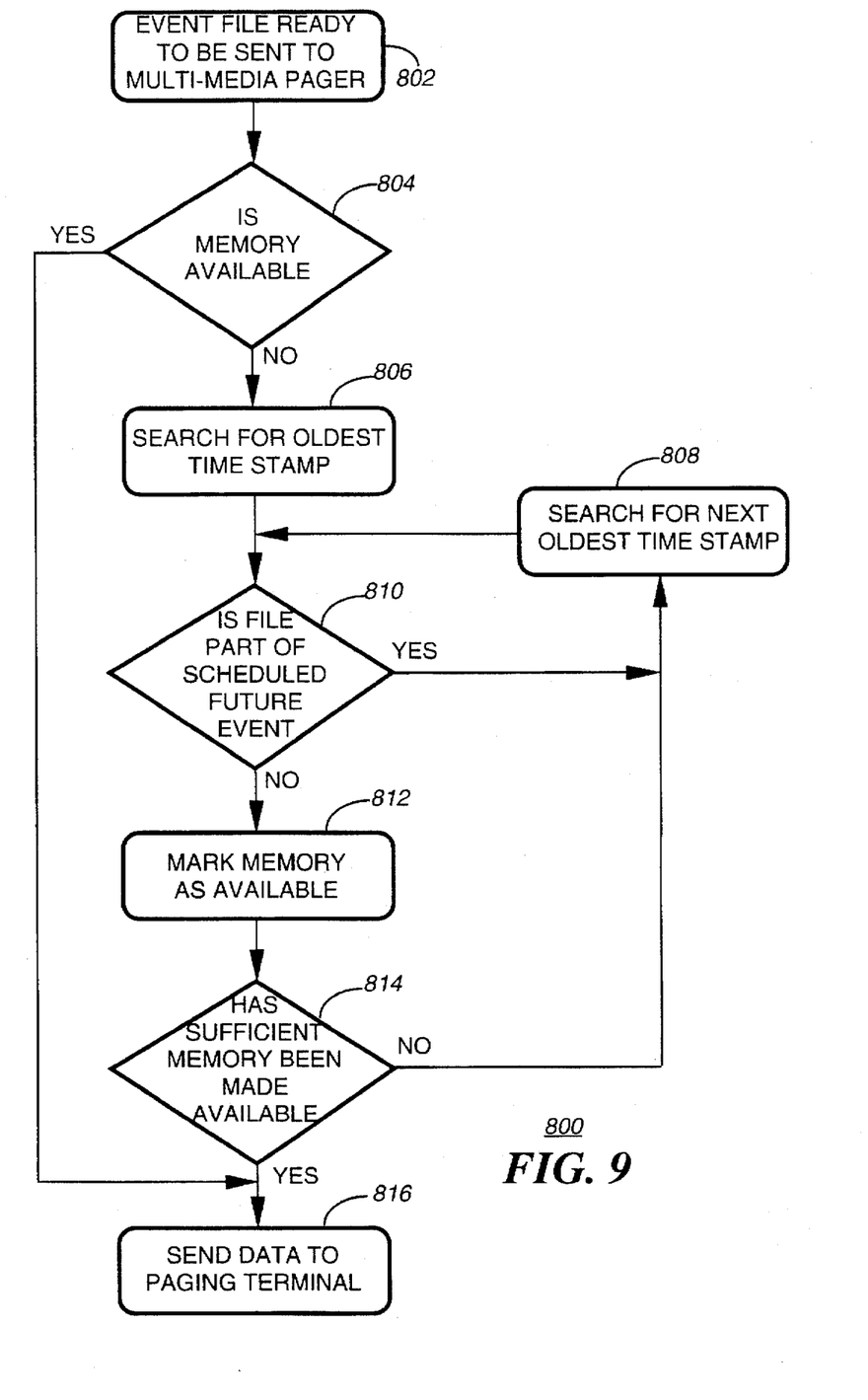
FIG. 9 is a flow chart depicting the steps used to locate memory in the multi-media receiver of FIG. 1.

FIG. 9 is a flow chart depicting the steps used to locate memory in the multi-media receiver 114 prior to transmission of an event file 600 to the multi-media receiver 114. Preferably the multi-media terminal 116 maintains a record of the memory usage in the multi-media receiver 114 and uses this record to identify one or more multi-media files that can be overwritten. The process starts when an event file is ready to be sent to the multi-media receiver 114 in step 802. In step 804 the multi-media terminal 116 searches it's record of the memory usage in the multi-media receiver 114 for available memory. When sufficient memory is available the process proceeds directly to step 816. The location of the available memory is added to event file 600 at the memory location 608. The file is then sent to the multi-media messaging terminal 106 for transmission to the multi-media receiver 114.

When insufficient memory is available in the multi-media receiver 114 for the event file 600 to be transmitted, the process proceeds to step 806 where the record is searched for the oldest time stamp. In step 810 a check is made to determine if the event file with the oldest time stamp is part of an event that is scheduled to play in the future. In the instance that the event file with the oldest time stamp is part of an event that is scheduled to play in the future, the process proceeds to step 808 where a search is made for an event file with the next oldest time stamp. From step 808 the process proceeds to step 810. When the event file with the oldest time stamp that is not is part of an event that is scheduled to play in the future is located, its memory location is marked as available in step 812. Step 814 makes a check to see if sufficient memory has been made available. When sufficient memory has been made available, the process proceeds to step 816 and sends the data to the multi-media messaging terminal 106 as described above. When insufficient memory has been made available the process goes to step 808 where additional memory is made available. This process leaves the most recent event files in memory for possible future usage by messages and subsequent multi-media commands and subsequent multi-media presentations. The multi-media receiver 114 stores earlier multi-media presentations and until they are overwritten by a later multi-media presentation. It will be appreciated that the process described can also be performed in the multi-media receiver 114 as well. It will also be appreciated that other memory management processes can be used as well.

Figure 10:
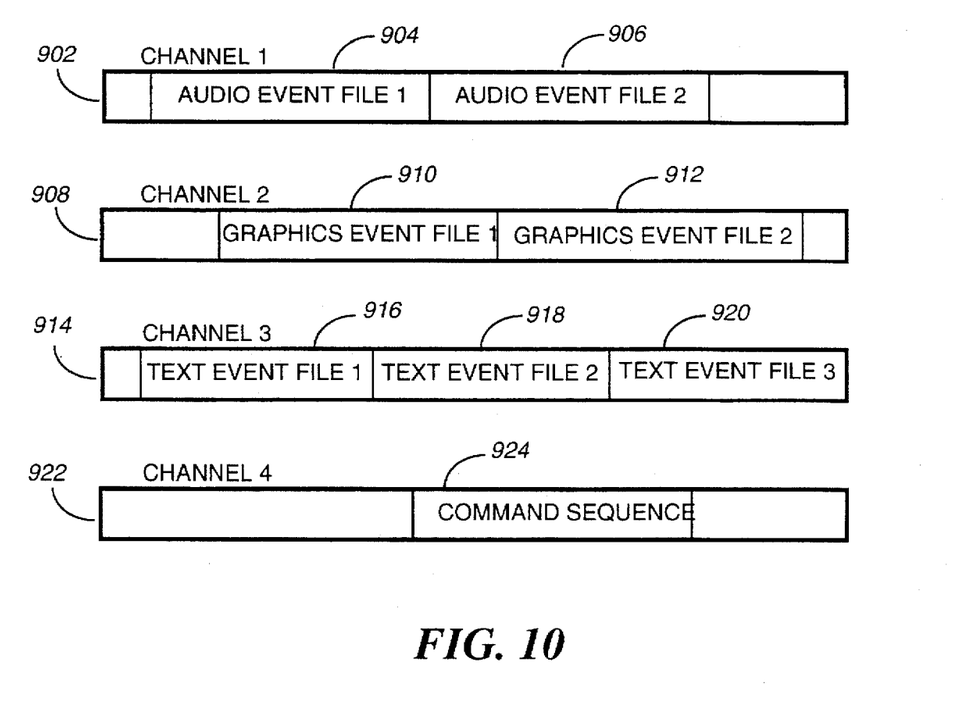
FIG. 10 is a diagram illustrating the use of the four independent channels of the FLEX™ protocol used to provide multi media transmission in the system shown in FIG. 1.

FIG. 10 is a diagram illustrating the use of the four independent channels provided by the FLEX™ protocol when transmitting a presentation to the multi-media receiver 114 in accordance with the preferred embodiment of the present invention. The FLEX™ protocol provides four communication channels illustrated as channel_1 902, channel_2 908, channel_3 914 and channel_4 922. In this example channel$_{13}$1 902 is being used to transmit the audio event files 904 and 906. Channel_2 908 is being used to transmit the graphics event files 910 and 912. Channel_3 914 is being used to transmit the text event files 916, 918, and 920. Channel_4 922 is being used to transmit the multi-media command sequence file 924. In the preferred embodiment of the present invention, the event files and the multi-media command sequence file 924 can be transmitted in random order and intermixed with other paging traffic. It will also be appreciated that event files and the multi-media command sequence file 924 for a program with a delay start time can be held in a queue until a low traffic period is experienced before transmission, for example, in the evening or at night. The FLEX™ protocol uses a 128 frame cycle that repeats every four minutes and is synchronized to the time of day. The multi-media receiver 114, by counting the FLEX™ 128 frame cycles, derives an accurate time of day indicator that can be utilized to start multi-media presentations at a specific time specified in the presentation start time field 704.

Figure 11:
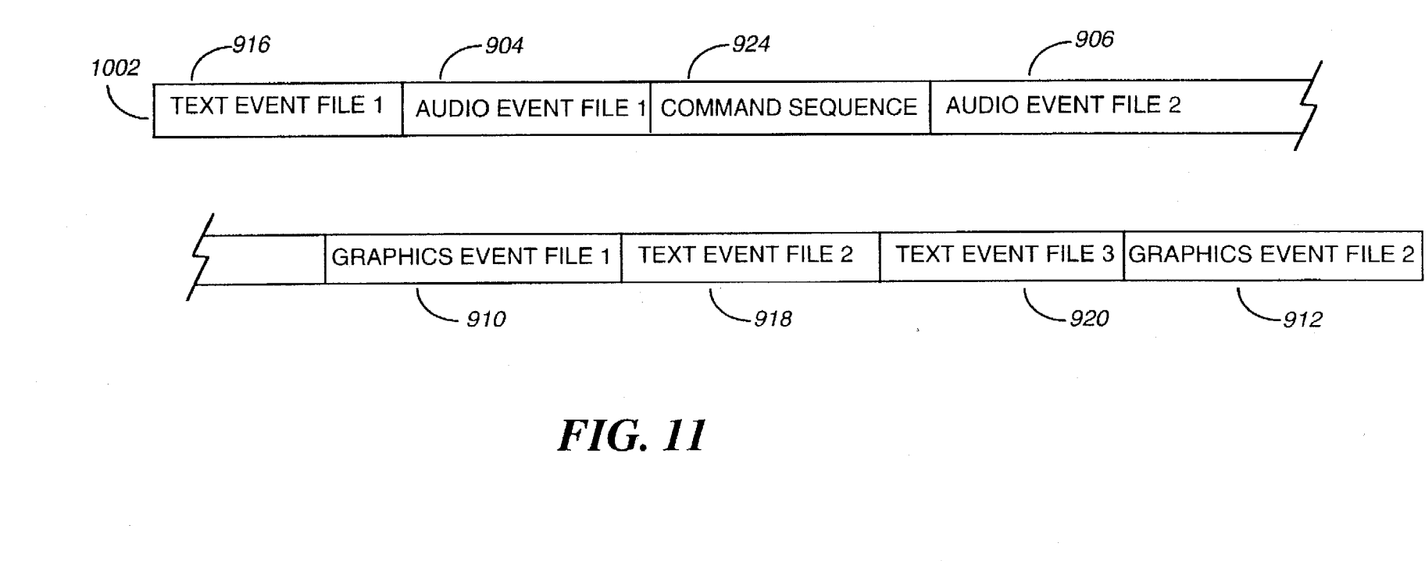
FIG. 11 is a diagram illustrating the use of a single channel to provide multi media transmission in the system shown in FIG. 1.

FIG. 11 is a diagram illustrating the use of single channels provided by a protocol other than FLEX™, such as the POCSAG protocol, for transmitting a presentation to the multi-media receiver 114 in accordance with an alternate embodiment of the present invention. The single communications channel is illustrated as communication channel 1002. In this example, communications channel transmits sequentially, text event file_1 916, followed by audio event file_1 904, multi-media command sequence file 924, audio event file_2 906, graphics event file_1 910, text event files_2 918, text event files_3 920, and graphics event file 2_912. In the preferred embodiment of the present invention, the event files and the multi-media command sequence file 924 can be transmitted in random order and intermixed with other paging traffic.

Figure 12:
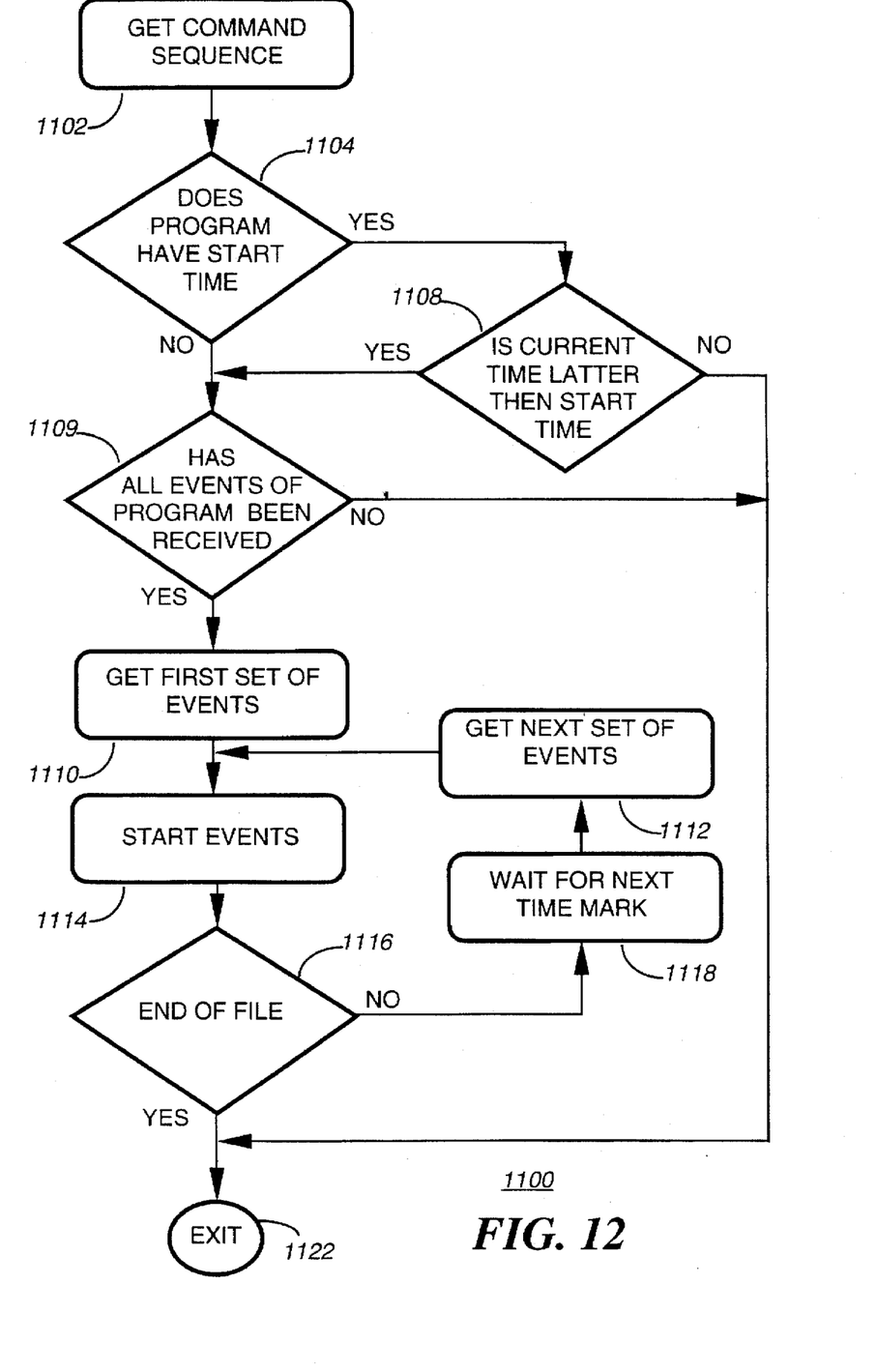
FIG. 12 is a flow chart showing the steps taken during a multi-media presentation using the multi-media receiver of FIG. 1.

FIG. 12 is a flow chart of a presentation process 1100 depicting the steps taken to play a multi-media presentation using the multi-media receiver 114. The multi-media presentations can be activated by a request from the user of the multi-media receiver 114, or by an automatic activation scheduled by the presentation start time field 704 in the multi-media command sequence file 700. The user of the multi-media receiver 114 can select and start a multi-media presentation in a similar manner to selecting and displaying a paging message using the user interface 1224. The operation of the user interface 1224 is described below in reference to the FIG. 13. When a presentation is selected the multi-media command sequence file 700 associated with that presentation is retrieved in step 1102. In step 1104 the multi-media command sequence file 700 is checked to see if the presentation start time field 704 has an entry. When the presentation start time field 704 has an entry, step 1108 checks to verify that the start time has passed. Presentation's with a multi-media command sequence file 700 that has an entry in the presentation start time field 704 are automatically started by the multi-media receiver 114 at the time specified in the presentation start time field 704 and are not allowed to be started prior to the presentation start time field 704. When current time is prior to the time specified in the presentation start time field 704, the process exits the presentation routine in step 1122, informs the user of reason for exiting and waits for another user input. This feature is provided to facilitate simultaneous announcements to a group of users. When the program does not have an entry in the presentation start time field 704, or the start time specified in the presentation start time field 704 has passed, the process goes to step 1109. In step 1109 the process checks the multi-media command sequence file 700 to verify that all of the event files 600 specified in the multi-media command sequence file 700 are present in the memory of the multi-media receiver 114. When one or more event files 600 are missing, the process goes to step 1122 exiting the process as described above. When all of the event files 600 specified in the multi-media command sequence file 700 are present the multi-media presentation is started in step 1114. In step 1114 the program goes to the multi-media command sequence file 700 and gets the file pointer or pointers associated with the with the first time marker. The process starts playing the event files 600 located in memory specified by the event file pointer or files pointers. In step 1116 the process checks the next event in the multi-media command sequence file 700. When the next event in the multi-media command sequence file 700 is an end of file marker 748 the presentation has completed and the process goes to step 1122 and exits. When the next event is another time marker, the process in step 1118 waits for the time specified in the marker to elapse. When the time elapse in step 1118 the next event is retrieved in step 1112 and played in step 1114. The process continues until a end of file marker 748 is found in step 1116.

Figure 13:
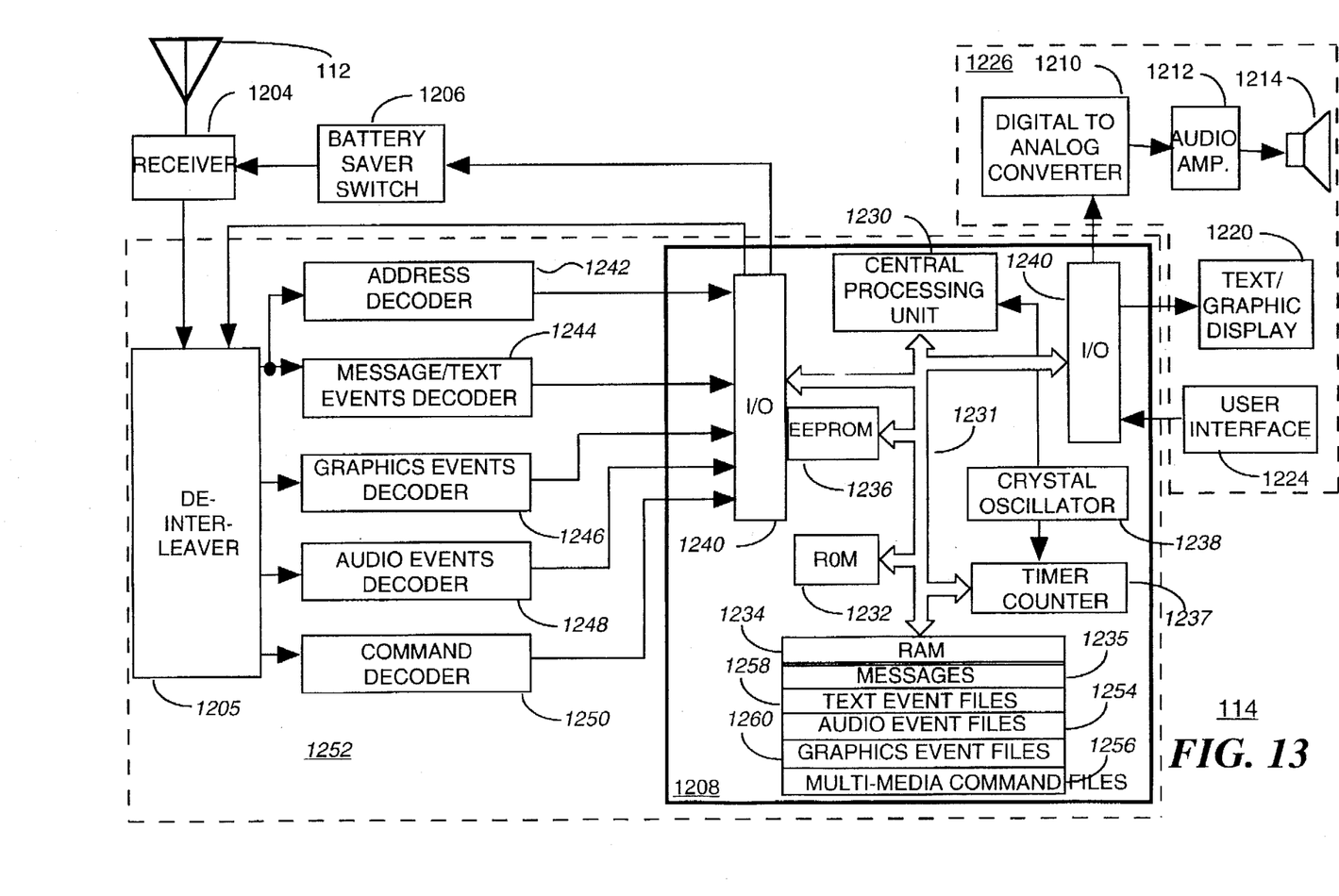
FIG. 13 is a electrical block diagram of a multi-media receiver of FIG. 1 in accordance with the present invention.

FIG. 13 is an electrical block diagram of the multi-media receiver 114 in accordance with the present invention. The signal transmitted from the transmitting antenna 110 is intercepted by the receiving antenna 112. The receiving antenna 112 is coupled to a receiver 1204. The receiver 1204 processes the signal received by the receiving antenna 112 and produces a receiver output signal that is a replica of the encoded data transmitted. The receiver output signal is coupled to de-interleaver 1205. The de-interleaver 1205 synchronizes with the four phases of the incoming data and de-interleaves the four channels of data in a process that is the reverse of the interleaving process described above, with reference to FIG. 3. The de-interleaver 1205 produces four channels of encoded code words corresponding to the four channels of encoded code words generated by the four frame encoders 314. The first channel of encoded code words is coupled to the address decoder 1242 and the message/text event decoder 1244, the second encoded code words is coupled to the graphics event decoder 1246, the third channel of encoded is coupled to the audio event decoder 1248 and the fourth channel of encoded code words is coupled to the multi-media command decoder 1250.

The address decoder 1242 decodes the address portion of the FLEX™ protocol. The output of the address decoder 1242 is coupled to the controller 1208. The controller 1208 compares the address received with the unique address stored in electrically erasable programmable read only memory (EEPROM) 1236 to determine if the data is intended for the multi-media receiver 114. The outputs of the address decoder 1242, the message/text event decoder 1244, the graphics event decoder 1246, the audio event decoder 1248 and the multi-media command decoder 1250 are coupled to the controller 1208 via the input/output circuit (I/O) 1240 and the address data buss 1231. The controller 1208 stores the event files 600 and multi-media command sequence file 700 in the designated location of a random access memory 1234 for retrieval later during the presentation process 1100.

The controller 1208 is also coupled to a battery saver switch 1206, a digital to analog converter 1210, a graphics display 1220, the user interface 1224 and the de-interleaver 1205 via the I/O circuit 1240 and the address data buss 1231 for the purpose of provides the basic control of the various functions of the multi-media receiver 114.

The multi-media presentation device 1226 includes the user interface 1224 the text/graphics display 1220 the audio circuit. The audio circuit includes the digital to analog converter 1210 the audio amplifier 1212 and speaker 1214. The user interface 1224 provides the user with an audio, visual or mechanical signal indicating the reception of a message, and push buttons or switches for the user to input commands to control the receiver. The text/graphics display 1220 is preferably a dot matrix LCD display capable of displaying the graphics events portion of the multi-media presentation. The text/graphics display 1220 can incorporate a graphics processor and display driver. The digital to analog converter 1210 receives digitized audio data portions of the multi-media presentation from the controller 1208 and produces an analog audio signal that is coupled to audio amplifier 1212 and speaker 1214. The battery saver switch 1206 provide a means of selectively disabling the supply of power to the receiver during a period when the system is communicating with other pagers or not transmitting, thereby reducing power consumption and extending battery life in a manner well known to one ordinarily skilled in the art.

The controller 1208 used in the multi-media receiver 114 comprises a processor 1230, such as a digital signal processor, a read only memory (ROM) 1232, the random access memory (RAM) 1234, a crystal oscillator 1238, a counter timer 1237, the electrically erasable programmable read only memory (EEPROM) 1236 and the i/O circuit 1240. The processor 1230 is preferably one of DSP56100 family of digital signal processors manufactured by Motorola Inc. The ROM 1232 is used to store the instructions used by the processor 1230 in performing the function used in the operation of the multi-media receiver 114. The functions stored in the ROM 1232 comprise a selector for initiating the retrieval of one or more multi-media events, the FLEX™ decoding function, the timing functions, the receiver control and battery saver functions, the audio event processing function, the graphics event processing function, the text event processing function and the conventional alpha and numeric paging functions. The RAM is used by the processor 1230 to store temporary variables used in performing the functions described above and to store paging messages 1235, text event file 1258, audio event file 1254, graphics event file 1260 and multi-media command file 1256. The EEPROM 1236 stores unique identification information or address information necessary for the controller 1208 to implement the selective call feature. The crystal oscillator 1238 provides the basic timing signals for the controller 1208 and is coupled to processor 1230 and the counter timer 1237. The counter timer 1237 is used by the processor 1230 to provide timing functions such as event start times and time marks. It will be appreciated that one or more of the elements that comprise the controller 1208 can be integrated into the same integrated circuit. It will be also appreciated that a digital signal processor can perform of the functions of the de-interleaver 1205, the address decoder 1242, the message/text event decoder, the graphics event decoder 1246, the audio event decoder 1248 and the multi-media command decoder 1250 as represented by the functional block 1252.

As can be seen from the above description, the present invention reduces the amount of data transmitted for a multi-media presentation by advantageous use of multi-media command sequence files and reuse of previously transmitted event files. The resulting multi-media presentation can be transmitted over a convention paging channel without impacting system capacity and will enhance user satisfaction and contribute to the commercial success of the system. Additional multi-media presentations can be developed by the multi-media originator which require only the a transmission of a multi-media command file when all of the event files are in the pager. Event files which are stored within the pager, in this example, can be replayed in different sequences, generating many different multi-media presentations with only the transmission of the multi-media command file.

I claim:

1. A multi-media receiver comprising:

a receiver for receiving messages and individual digitally encoded multi-media event files transmitted over a radio frequency channel, the individual digitally encoded multi-media event files including one or more text event files representing text events, one or more graphics event files representing graphics events, and one or more audio event files representing audio events, and multi-media command files utilized to relate text event files, graphics event files, and audio event files as a multi media event presentation;

a memory, coupled to said receiver, for storing messages received, and further for storing individual digitally encoded multi-media event files and the multi-media command files;

a presentation device for presenting a multi-media event presentation;

a user interface for enabling a user to initiate a multi-media event presentation using said presentation device; and a controller, coupled to said memory and responsive to said user interface and the multi-media command files stored in said memory, for controlling selective retrieval of text event files from the one or more text event files, of graphics event files from the one or more graphics event files, and of audio event files from the one or more audio event files stored in said memory, said controller further coupled to said presentation device for controlling a substantially concurrent presentation of the text event files, the graphics event files, and the audio event files which are selectively retrieved to generate the multi-media event presentation.

2. The multi-media receiver according to claim 1, wherein the multi-media event presentation comprises a substantially concurrent presentation of a sequence of text event files, graphics event files and audio event files selectively retrieved from the one or more text event files, the one or more graphics event files, and the one or more audio event files stored in memory.

3. The multi-media receiver according to claim 2, wherein the multi-media command files comprise time marks designating starting times for the sequence of the one or more text event files, graphics event files, and audio event files.

4. The multi-media receiver according to claim 3, further comprising a timer, coupled to said controller, for generating timing signals, wherein said controller is responsive to the timing signals and to the time marks for controlling a selective retrieval of the sequence of the text event files, the graphics event files, and the audio event files.

5. The multi-media receiver according to claim 4, wherein said controller is responsive to said timer and the multi-media command files being received for automatically starting the multi-media event presentation at a time designated by the time marks.

6. The multi-media receiver according to claim 1, wherein different multi-media event presentations are presented by retrieving different multi-media command files to control selective retrieval of different ones of the one or more text event files, the one or more graphics event files, and the one or more audio event files.

7. The multi-media receiver according to claim 1, wherein said receiver receives information transmitted on a plurality of subchannels, and wherein the text event files, the graphics event files, and the audio event files, and the multi-media command files are received substantially simultaneously on different ones of the plurality of subchannels.

8. The multi-media receiver according to claim 7, wherein the plurality of subchannels are provided by interleaved transmission phases transmitted on a single carrier frequency.

9. The multi-media receiver according to claim 7, wherein messages and subsequent multi-media command files are transmitted on the plurality of subchannels.

10. The multi-media receiver according to claim 1, wherein the messages are selective call messages directed to one or more designated multi-media receivers.

11. The multi-media receiver according to claim 1 wherein the messages further include information service messages which are directed to subscribers of information services.

12. The multi-media receiver according to claim 1 wherein said presentation device comprises:

a display for displaying the text event files and further for displaying the graphics event files; and an audio circuit for reproducing the audio event files.

13. The multi-media receiver according to claim 12 wherein the audio event files comprise digitized audio data, and wherein said audio circuit comprises:

a digital to analog converter for converting the digitized audio data into an analog audio signal which is a replica of the audio events;

an audio amplifier for amplifying the analog audio signal; and a speaker, coupled to said audio amplifier, for reproducing the replica of the audio events.

14. A system for transmitting messages and multi-media presentations to a multi-media receiver, said system comprising:

a multi-media messaging terminal comprising a controller for controlling preparation and transmission of a multi-media presentation comprising individual digitally encoded multi-media files including one or more user programmed text event files representing text events, one or more user programmed graphics event files representing graphics events, and one or more user programmed audio event files representing audio events, and user programmed multi-media command files which are utilized to relate text events, graphics events, and audio events, a memory, coupled to said controller, for storing the one or more user programmed text event files, the one or more user programmed graphics event files, and the one or more user programmed audio event files, and the user programmed multi-media command files, said memory further for storing a record of the multi-media files transmitted to and stored within the multi-media receiver, and a multi-media interface, coupled to said controller for transferring the multi-media files to a paging system; said paging system comprising a paging terminal comprising a multi-media interface for receiving the multi-media files being transferred from said multi-media messaging terminal, and an encoder, coupled to said multi-media interface, for encoding messages and the multi-media files received for transmission; and a transmitter, coupled to said encoder, for transmitting the messages and the multi-media files which are encoded.

15. The system for transmitting multi-media presentations according to claim 14 wherein said memory comprises a mass storage device.

16. The system for transmitting multi-media presentations according to claim 14 wherein the record of the multi-media files stored within the multi-media receiver is maintained for future usage by the—multi-media receiver and one or more additional multi-media receivers.

17. The system for transmitting multi-media presentations according to claim 15 wherein said mass storage device further stores a record of memory usage in the multi-media receiver.

18. The system for transmitting multi-media presentations according to claim 17 wherein the record of memory usage includes a list of multi-media files stored within the multi-media receiver.

19. The system for transmitting multi-media presentations according to claim 18 wherein said list further includes a time stamp identifying a time of transmission of the multi-media presentation.

20. The system for transmitting multi-media presentations according to claim 18 wherein a subsequent multi-media presentation directed to the multi-media receiver includes one or more multi-media files previously stored within the multi-media receiver, and one or more additional multi-media files which subsequently are transmitted to the multi-media receiver.

21. The system for transmitting multi-media presentations according to claim 20, wherein the multi-media receiver stores an earlier multi-media presentation and a later multi-media presentation, and wherein one or more multi-media files for the earlier multi-media presentation are overwritten by the one or more multi-media files for the subsequent multi-media presentation.

22. The system for transmitting multi-media presentations according to claim 21, wherein said controller further determines a future usage of one or more multi-media files, and wherein the one or more multi-media files having a future usage are not overwritten by the one or more multi-media files of the subsequent multi-media presentation.

* * * * *